Feb. 27, 1973 C. F. W. EKMAN 3,718,465

DIFFUSION TRANSFER ELEMENT AND METHOD

Filed May 18, 1970 2 Sheets-Sheet 1

Feb. 27, 1973 C. F. W. EKMAN 3,718,465

DIFFUSION TRANSFER ELEMENT AND METHOD

Filed May 18, 1970 2 Sheets-Sheet 2

INVENTOR.
CARL F. W. EKMAN
BY Stanley Belsky

ATTORNEYS

United States Patent Office 3,718,465
Patented Feb. 27, 1973

3,718,465

DIFFUSION TRANSFER ELEMENT AND METHOD

Carl F. W. Ekman, Bedford, Mass., assignor to Itek Corporation, Lexington, Mass.

Continuation-in-part of application Ser. No. 492,254, Oct. 1, 1965. This application May 18, 1970, Ser. No. 38,029

Int. Cl. G03c *1/68*

U.S. Cl. 96—29 26 Claims

ABSTRACT OF THE DISCLOSURE

Process and products for recording an image comprising (1) exposing a copy medium comprising a photosensitive material capable upon exposure of producing a physically developable image and image-forming materials which upon exposure will undergo an oxidation-reduction type reaction to form an insoluble image in the exposed portions of the medium, (2) contacting this medium with an image-receiving medium in the presence of solvent for the image-forming materials, whereby the image-forming materials in the unexposed portions of the image storage medium are transferred to the image-receiving medium, and the transferred image-forming materials establish a positive image pattern in the image-receiving medium. The invention also relates to systems for practicing these processes.

Figure 1:
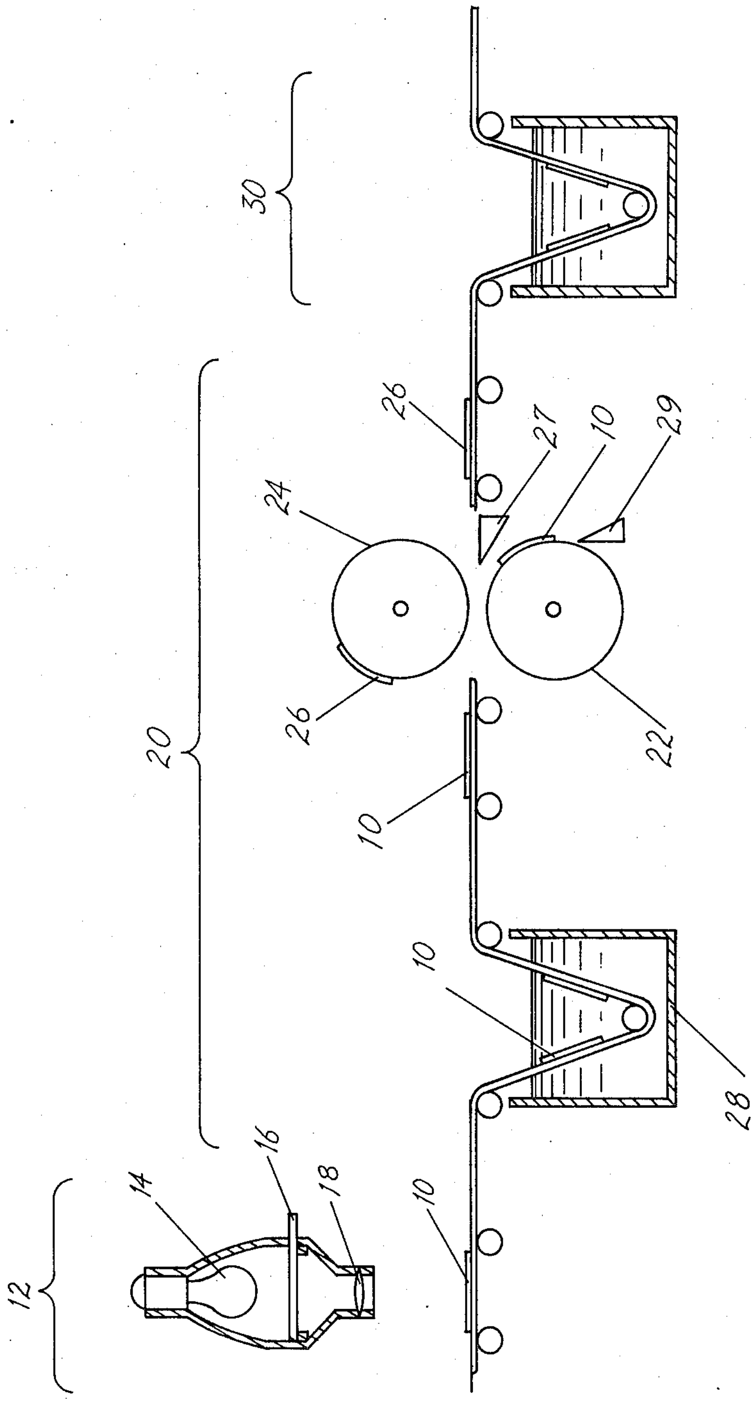

This application is a continuation-in-part of Ser. No. 492,254, filed Oct. 1, 1965, now abandoned.

This invention relates to data storage systems. More precisely, the invention disclosed herein relates to an improved data storage system comprising media in which data or images can be stored and conveniently retrieved therefrom in a relatively simple fashion, in the form of positive image patterns.

The diffusion transfer reversal process is a technique for producing prints having positive image patterns. Actually, said process has been applied almost exclusively to media comprising radiation sensitive silver halides as the photosensitive component thereof. Silver halide containing media are especially suitable for said process, since upon very short exposure thereof definitive gradients of differential solubilities are readily established between the exposed and nonexposed portions of the media. For example, the photosensitive component in the exposed portion of the media is readily converted to photolytic silver, while the nonexposed portion comprises silver halide, which can be selectively dissolved by diverse solvents. Accordingly, in present commercial practice, the steps of the diffusion transfer reversal process involve first, the exposure of media comprising a silver halide emulsion to establish a negative image pattern therein. Thereafter, the exposed media are contacted with image receiving media which are generally nonlight sensitive in nature. The contact between exposed media and image receiving media occurs in the presence of a solvent for the silver halide occupying the nonexposed portion of the media. Thus, a positive image pattern of ionic silver is established in nonlight sensitive image receiving media. Said pattern is then developed to produce a visible, positive image pattern.

Despite the fact that diffusion transfer reversal processes similar to that discussed above or slight modifications thereof, are presently used in the art, nevertheless, the process is not without outstanding problems. For example, considerable care must be taken in the selection of a proper solvent for use in the transfer step. Oftentimes suitable solvents must be rejected or otherwise avoided because of detracting properties thereof, such as odor, viscosity, toxicity, and other factors which render same unqualified in diffusion transfer applications.

Many efforts have been made to overcome such outstanding problems. For example, U.S. Pat. No. 3,042,514 proposes a solution to the above-mentioned solvent problem. Said patent relates to a process in which water soluble, radiation sensitive silver compounds are included as photosensitive components of the image storage media. In accordance with the teachings of said patent, water is used as the solvent in the diffusion transfer step. However, the use of water soluble, radiation sensitive silver compounds imposes severe restrictions on the diffusion transfer processes utilizing same. For example, the overall photographic speed of the media involved is adversely affected, since extremely long exposure times to exceedingly high sources of radiant energy are required to convert the exposed water soluble silver compounds to photolytic silver. Accordingly, said patent teaches that exposure times of at least about 4 minutes are required in order to establish gradients of differential solubilities between the exposed and nonexposed portions of the media, to ensure a suitable transfer of positive image patterns to receiving media. In view of the many desirable features of diffusion transfer reversal processes, it would be most desirable to provide a commercially attractive diffusion transfer process in which simple polar solvents, such as water, can function as a diffusing vehicle to transfer positive image patterns from media which can respond to practical exposure sources and times. A process by which such accomplishments could be obtained would be, indeed, a notable contribution to the art.

A principal object of the present invention is to provide an improved data storage system.

Still another object of the present invention, is to provide an improved image storage system in which positive image patterns can be easily transferred by simple solvents, such as water, from media having image patterns which were established therein by short exposure thereof to practical exposure sources.

Other objects and advantages of the present invention will in part appear hereinafter or will in part be obvious to those skilled in the art.

Broadly, the above objects and advantages are realized in accordance with the practice of the present invention by a novel data storage and retrieval system involving an integration of steps as applied in a definite sequence to particular image storage media, as well as novel arrangements of elements which cooperate to accomplish the purposes of the system. More precisely, the steps of the data storage system of the present invention involve the exposure of media comprising a radiation sensitive material which is capable upon exposure of producing a physically developable image and a water soluble, radiation sensitive metal compound which can be converted to a photolytic species thereof. The water soluble compound is one such as silver nitrate which dissolves readily in water. Accordingly, an irreversible image pattern is readily established in media of the present invention by exposure sources and exposure times which are well within limits that are both commercially acceptable and tolerable. Thus, diffusion transfer can be achieved in the system of the present invention by contacting the above-mentioned image storage media with image receiving media, in the presence of moisture, for example. The moisture can be present in the form of water, steam, or a water precursor which can liberate water on the application of heat. Said water precursor can be present in either the image storage media or in the image receiving media. After maintaining the image containing media and receiving media in contact for a short time—generally less than about 20 seconds is sufficient—the media are separated and the positive image pattern so established in the receiving medium is developed in accordance with procedures which shall be set forth in more detail hereinafter.

The image storage media which are exposed in the system of the present invention comprise a substrate and an image storage system comprising two essential ingredients: (1) a radiation sensitive material which upon exposure produces a physically developable image, and (2) a water soluble metal compound which can be converted to a water insoluble photolytic species thereof. As radiation sensitive materials, photoconductor compounds of zinc, titanium and cadmium are suitable. Especially preferred are titanium dioxide and zinc oxide. As water soluble compounds, compounds of metals, including silver, mercury, gold, manganese, lead, nickel, tin, chromium, platinum and copper are suitable. Especially preferred are the compounds of silver, mecrcury, copper and gold. Media suitable for the practice of the present invention are described in more detail in U.S. Pat. 3,052,-541 and 3,149,970 and U.S. Ser. No. 862,912, filed Oct. 1, 1969, in the names of R. Gracia, R. Laughrey and P. Tuohey, which are incorporated herein by reference. It is to be understood that the above-mentioned ingredients need not be present in media of the present invention until exposure thereof. For example, the above-mentioned water soluble metal compound can be conveniently applied to media comprising photosensitive photoconductive materials immediately prior to the exposure step.

The radiation sensitive material of the present invention can be any of those which permit physical development of a metal image, i.e. physically developable photosensitive materials. This type of photosensitive material is known in the art and embraces those photosensitive materials which after photoexposure are developable by what is known as physical development. Physical development is development using a solution of reducible metal ions and a reducing agent therefor which will selectively deposit metal in the photoactivated areas. In theory, the first step of such development is the formation of a latent metal image which is then intensified, or amplified, by the metal obtained by reduction of the aforesaid metal ions. The metal of the latent metal image may be the same as the so-reduced metal or different, e.g., the latent image can be silver and the so-reduced metal, copper or silver, as desired. In silver halide photography, the latent silver image forms in the silver halide emulsion and physical development is used to render the photo-image visible. The silver halide in this instance, unlike conventional silver halide photography acts primarily as a sensor for activating radiation since most of the visible image is produced by reason of the germ image formed upon exposure with the image forming materials comprising a solution of metal ions. Suitable photosensitive materials include silver halides, such as a silver chloride or bromide; azo compounds, e.g. as described in British specification 1,064,726, among others; combination of an amine and halogenated alkane such as disclosed in British Pat. No. 1,118,667; photoconductors, as described in British specification 1,043,250; and ferric compounds.

A physically-developed image can be:

(1) the image formed on photoexposure, e.g. the latent silver image in silver halide emulsions or the reversible latent image on a photoconductor;
(2) the irreversible image formed by contacting an exposed photoconductor-bearing medium with a sensitizing metal ion, e.g. a solution of silver ion, which can lead to an invisible irreversible image or a visible metal image;
(3) the latent ferrous ion image formed by photoexposure of a ferric salt-sensitized medium and then sensitized with silver ion solution to form a silver image; or
(4) a conductive image which may be produced photographically, by printing, by writing or by physically placing a metallic image on the support.

Of the photosensitive materials, especially preferred are the reversibly activatable photoconductors, which upon exposure to activating radiation are substantially chemically unchanged. These photoconductors preferably used in the media which are found to be useful in this invention are metal containing photoconductors. The preferred photoconductors useful in this invention are ones which remain substantially chemically unchanged upon exposure to activating radiation, e.g. $TiO_2$. A preferred group of such photoconductors are inorganic materials such as the compounds of a metal and a non-metallic element of Group VI–A of the Periodic Table, e.g., oxides such as zinc oxide, titanium dioxide, zirconium dioxide, germanium dioxide, and indium trioxide; metal sulfides such as cadmium sulfide (CdS), zinc sulfide (ZnS), and tin sulfide (SnS); and metal selenides such as cadmium selenide (CdSe). Metal oxides are preferred photoconductors of this group; and titanium dioxide is a preferred metal oxide because of its sensitivity, availability, and color. Titanium dioxide which has an average particle size less than about 250 nanometers and which has been treated in an oxidizing atmosphere at a temperature between about 200° C. and 950° C. for from about 0.5 hour to about 30 hours is especially preferred, and more especially that titanium dioxide produced by high temperature pyrolysis of a titanium halide.

While the exact mechanism by which the photoconductors work is not known, it is believed that exposure of the photoconductors or photocatalysts to activating means causes an electron or electrons to be transferred from the valence band of the photoconductor or photocatalyst to the conductance band of the same or at least to some similar excited state whereby the electron is loosely held, thereby changing the photoconductor from an inactive form to an active form. If the active form of the photoconductor or photocatalyst is in the presence of an electron accepting compound a transfer of electrons will take place between the photographic and the electron accepting compound, thereby reducing the electron accepting compound. Therefore, a simple test which may be used to determine whether or not materials have a photoconductor or photocatalytic effect is to mix the material in question with an aqueous solution of silver nitrate. Little, if any, reaction should take place in the absence of light. The mixture is then subject to light. At the same time a control sample of an aqueous solution of silver nitrate alone is subjected to light, such as ultraviolet light. If the mixture darkens faster than the silver nitrate alone, that material is a photoconductor or photocatalyst.

The image-forming materials of this invention are substantially non-radiation sensitive materials which chemically react upon contact with an activated photoconductor. The preferred materials are physical developers and preferably comprise a solution of metal ions and a reducing agent therefor. These image-forming materials form a major portion of the density of the final image and preferably form substantially all of the image density. Preferred imaging metals are silver, copper, nickel, tin, mercury and gold. These metals are formed upon the reduction of a metal ion of the image-forming materials. The image-forming materials may be in a solid form, which are readily soluble in solvents such as water or in the form of a solution, e.g. in a liquid, viscous or gel state, which may be placed in a pressure releasable container, in the photosensitive layer or in the image receiving layer.

The radiation sensitive layer can be exposed to any suitable activating radiation. Activating radiation as used herein is intended to include ultraviolet light, X-ray radiation, visible light, electron beams, gamma rays, heat and other means which will cause the exposed portions of the photosensitive layer to become capable of being selectively physically developed to produce a metallic image.

Figure 2:
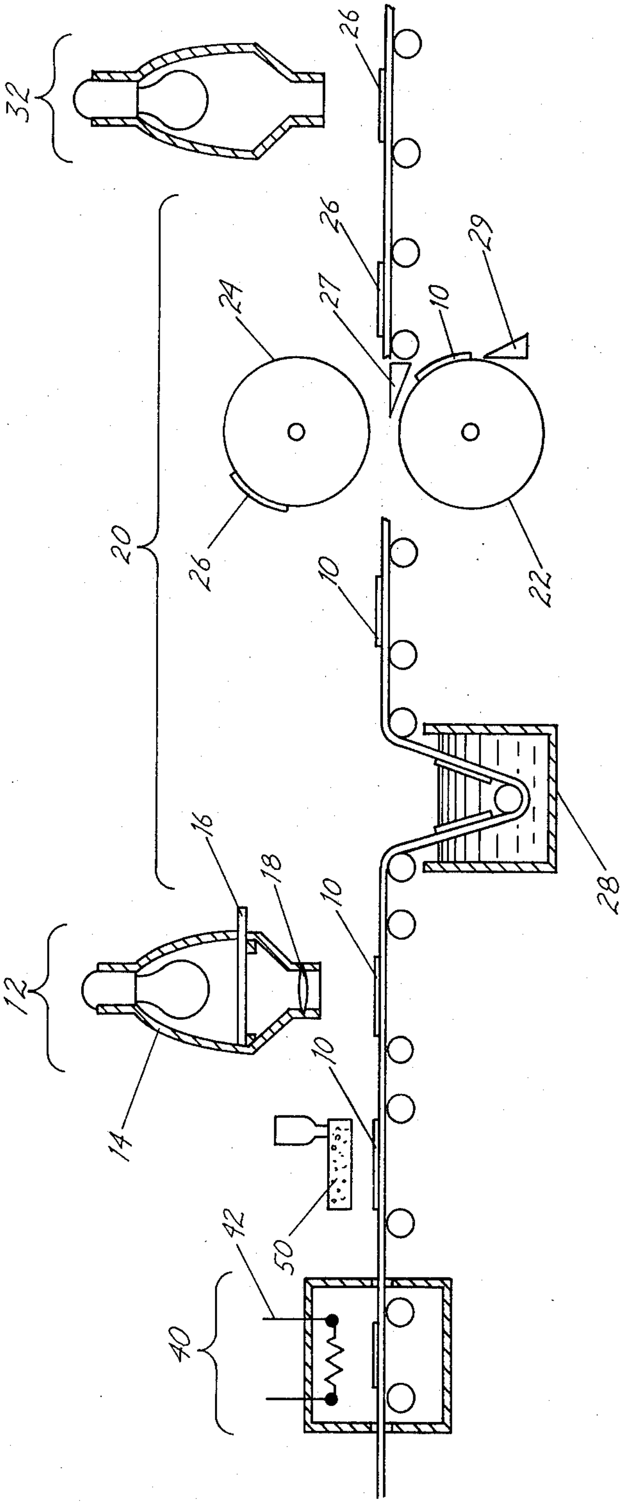

The system of my invention will be better understood with reference to the attached drawings, which illustrate in schematic form, suitable arrangements of apparatus useful in the practice of my invention. FIG. 1 illustrates an arrangement of apparatus suitable for accomplishing the essential steps of my invention, while FIG. 2 illustrates an especially preferred arrangement of apparatus.

Referring now to FIG. 1, image patterns can be stored in an image storage medium of the present invention 10 by exposure thereof to exposure means 12. Exposure means 12 includes source 14 of activating radiation, transparency 16, comprising an information image pattern desired to be stored, and appropriate optical system 18, for forcusing the image on medium 10. In general, image patterns can be stored in media of the present invention by exposure thereof to a source of radiation 14, having a wavelength such that the image storage media can absorb same. The best results are realized by exposing media of the present invention to light having a wavelength between about 0.2 micron to about 0.5 micron. Accordingly, suitable light sources include mercury arc lamps, tungsten arc lamps, photoflash lamps, and the like. The time of exposure will be determined primarily by such factors as the nature and strength of source 14 and the distance of the medium 10 from the source 14. Such factors are routine considerations normally encountered in conventional photographic processes. Thus, proper exposure time will be readily determined by one well skilled in the art. As an example, however, exposure times of considerably less than about 20 seconds, and more often than not, less than about 10 seconds, are normally suitable. After exposure, image containing medium 10 is then guided to image pattern transfer means 20 by suitable means. Transfer means 20 includes elements which can apply a suitable solvent, such as moisture, to medium 10 and/or image storage medium 26, prior to the time said media contact each other. For example, as shown in FIG. 1, the image containing medium 10 is conveyed through bath 28 prior to contacting image receiving medium 26. Bath 28 can contain a suitable solvent, such as water, or preferably an aqueous or partially aqueous developer system such as the type described in commonly owned British Pat. 1,043,250, or U.S. Ser. No. 744,631, filed July 15, 1968. The application of such developer systems to the image pattern at this point, in most instances renders the pattern on the image containing medium 10 visible. Said developer systems comprise organic reducing agents and acids. Suitable reducing agents include hydroquinone, metol, phenidone, ferrous-ferric couple, and the like, while the acids employed can be organic or inorganic acids, with citric acid being preferred. Image pattern transfer means 20 also includes transfer elements, such as two rotatable rollers 22 and 24, suitably adjusted to provide close contact between media passing therebetween. Roller 22 conveys image containing medium 10 into contact with an image receiving medium 26, shown disposed on roller 24. It is to be understood that transfer means 20 can also include means for synchronizing the rotation of the rollers to provide suitable contact time between the media. In this respect, the contact time need not exceed 20 seconds, and often, contact times of less than about 5 seconds are sufficient. Also, transfer means 20 can include other control or adjustment devices and like means which can cooperate to provide effective contact between image containing medium 10 and image receiving medium 26.

After media 10 and 26 pass between rollers 22 and 24, the image receiving medium 26 contains a positive image pattern and the media are then stripped apart, such as by separation means 27. As shown, image containing media 10 remains on roller 22 after separation and is removed therefrom by any convenient means, such as by knife edge 29.

The positive image pattern on medium 26 can be latent, partially developed, or developed, depending upon such factors as the contents of bath 28 and the amount of activating radiation to which image receiving medium 26 is exposed after separation from medium 10. For example, medium 26 will usually contain a latent positive image pattern when bath 28 contains only moisture, since said pattern comprises the water soluble, radiation sensitive compound. In such an event, image receiving medium 26 is next contacted with a developer system, 30, which comprises a substance capable of reacting with the compound comprising the positive image pattern to produce a species thereof which can be interpreted by visual readout. For example, developer system 30 can comprise a substance which can reduce the compound comprising the positive image pattern to a visible metallic species thereof. In the event that bath 28 contains a developer, the positive image pattern on medium 26 will comprise the water soluble, radiation sensitive compound and a developer which can react with said compound either directly or in the presence of activating radiation to achieve visual readout of said pattern. Such an alternative will be discussed in more detail hereinafter.

FIG. 2 illustrates an especially preferred embodiment of my invention. In this embodiment, the photosensitive system of medium 10 does not initially comprise a water soluble metal compound which can be converted to a water insoluble photolytic species thereof. Instead medium 10 comprises a photosensitive, photoconductive material such as zinc oxide, or a photoconductor such as titanium dioxide. Such reversibly activatable photoconductor containing media can be conveniently prepared in the light but should be deactivated prior to exposure in order to ensure quality image patterns. Accordingly, image receiving medium 10, comprising titanium dioxide is preferably first guided to deactivating means 40, which uniformly deactivates the photoconductive material of medium 10, thereby assuring a high degree of uniform image quality for the system. As shown, deactivating means 40 includes light shielded electric heating coil 42, which as a source of infrared radiation can uniformly deactivate medium 10. Still other suitable deactivation techniques include playing a corona discharge, as from a Tesla coil, onto medium 10, or simple dark storage of said medium.

After uniform deactivation in deactivating means 40, a solution of silver nitrate or like soluble metal compound is uniformly applied to medium 10 by coating means 50. Coating means 50 can be a sponge, brush, spray or the like. Medium 10 is next conveyed to exposure means 12 where an image pattern is stored in medium 10 in accordance with the manner discussed in the description of the function of exposure means 12 of FIG. 1.

The exposed medium 10 is then conveyed to transfer means 20 and there passes through tank 28, which contains a developer system comprising, for example, phenidone and citric acid in water or methanol or a mixture thereof. As stated, the application of such a developer system to exposed medium 10 at this point is especially advantageous, since the compounds in the exposed portions thereof are readily converted to an insoluble, oftentimes visible, photolytic species, while the compound in the nonexposed portion is relatively unaffected by the developer system.

Medium 10 is then contacted with image receiving medium 26, as both media pass between rollers 22 and 24. After passing through said rollers, media 10 and 26 are separated by separation means 27, and medium 10 is separated from roller 22 by knife edge 29.

Image receiving medium 26, which now contains a positive image pattern comprising a soluble metal compound and a developer system, is then conveyed to exposure means 32, and the surface thereof which contains the positive image pattern is uniformly exposed thereto. Although exposure means 32 is shown as an element distinct from exposure means 12, nevertheless, exposure means 12 could be used, but, of course, transparency 16 must be removed therefrom. Also, as an alternative to the above-described procedure, image receiving medium 26 can be uniformly exposed briefly to exposure means 32 prior to contacting said medium with image containing medium 10. In either event, that is to say, whether exposure of medium 26 occurs before or after the transfer step, the positive image pattern obtained in medium 26 is visible. However, if desired, additional development or amplification systems can be applied to medium 26. Also, it is to be understood that in the systems of FIGS. 1 and 2 additional processing steps to produce a finished print of desired quality can be involved. Such additional steps include drying as well as applying to the image receiving medium 26, other processing solutions, such as fixing solutions, amplifying solutions, and the like.

Many types of image receiving media can be suitably used in our process and said image receiving media can contain suitable nucleating agents, such as silver sulfide or finely divided gold or silver which can aid in precipitating free metal from the soluble compound. However, in the most preferred embodiment of the present invention the image receiving medium, 26, comprises a radiation sensitive photoconductive material. For example, high quality positive image patterns can be readily obtained in image receiving media comprising titanium dioxide or zinc oxide, especially if the image pattern transferred thereto comprises developer, and such image receiving media are uniformly exposed briefly to a source of activating radiation either before or after the transfer step as set forth in the discussion of FIG. 2.

A preferred embodiment of this invention is where the photosensitive medium and the receiving medium form a unitary package, such that the photosensitive layer can be exposed and pressure applied to activate the image forming material to thereby cause an oxidation-reduction reaction to take place to cause a negative image to form on the photosensitive layer and a positive image to form on the image receiving medium. The image forming materials may be present in a number of different combinations. For example, a substantially non-photosensitive oxidizing agent such as a solvent soluble metal compound such as silver nitrate is placed in the photosensitive layer and a reducing agent in a pressure reelasable container is placed between the image receiving medium and the photosensitive layer. After exposure of the photosensitive layer, pressure is applied to release the reducing agent to thereby cause an image to be formed in the photosensitive layer which is a negative of the original and a positive of the original to be formed in the receiving sheet. Alternatively, the reducing agent and oxidizing agent could be reversed in the above mentioned copy medium, i.e., the reducing agent could be in the photosensitive layer and the oxidizing agent could be in a viscous solution in a pressure releasable container between the image receiving medium and the photosensitive medium. Also the oxidizing agent could be in the photosensitive layer and the reducing agent in the image receiving layer, which are separated by a layer which will allow reaction to take place between the reducing agent and oxidizing agent upon application of pressure to the combined media. Alternatively, the reducing agent could be in the photosensitive layer and the oxidizing agent in the image receiving layer. Alternatively, both the oxidizing agent and reducing agent may be in pressure releasable containers between the photosensitive layer and the image receiving layer. In this last embodiment both the oxidizing agent and reducing agent may be in a unitary solution, preferably in a viscous form, in the form of a stabilized unitary physical developer. The oxidizing and reducing agents could also be separated by other means such that application of heat, solvents or other means would cause the reaction to take place.

The following examples set forth in detailed fashion, various embodiments of my invention. It is to be understood that the following examples are illustrative in nature and in no way are they to be construed so as to limit my invention beyond those limitations expressly set forth in the present specification or in the claims which appear hereinafter.

EXAMPLE 1

An image storage medium especially suitable for the practice of the present invention was prepared by dispersing 16 parts by weight of finely divided titanium dioxide having an average particle size of about 0.03 micron in about 75 parts by weight of water which contained about 0.32 part by weight of sodium hexametaphosphate as a dispersing agent. The pigment was added with stirring, and the mixture was thoroughly agitated to disperse the titanium dioxide uniformly therethrough.

About 8.5 parts by weight of 47 percent "Rhoplex," an aqueous polyacrylate latex, were next combined with the dispersion containing the particulate titanium dioxide. The mixture, which was thoroughly stirred, thus contained about 4 parts acrylate solids by dry weight, so that the weight ratio of $TiO_2$ to binder solids was 4 to 1. The resulting mixture was coated on single weight baryta paper. The coating weight of said photosensitive medium was about 6 pounds per 3,000 square feet.

The medium was immersed in a saturated solution of silver nitrate and then exposed in a Beseler box to ultraviolet light from a 4-watt, black light fluorescent lamp for about 5 seconds.

The exposed medium is then pressed in contact with a moist image receiving medium and maintained in contact therewith for about 5 seconds. The media are then stripped apart and the image receiving medium is contacted with a developer solution comprising hydroquinone. A visible image pattern is obtained in the image receiving medium.

It is to be understood that various organic and inorganic soluble silver compounds, such as the salts thereof, can be applied to the medium prior to exposure with substantially the same results as are achieved with silver nitrate. For example, other suitable silver compounds include silver acetate, silver sulfate, silver thiosulfate, silver nitrate, and the like. Also like soluble compounds of metals such as copper, mercury, and gold are suitable.

EXAMPLE 2

An aqueous dispersion of zinc oxide in "Rhoplex" is ball milled for about 12 hours. A light sensitive medium is prepared by coating the dispersion about 4 mils thick on a polyethylene terephthalate film, more commonly known as "Mylar." The medium is immersed in a saturated solution of silver nitrate and immediately exposed to the source of Example 1.

The so exposed medium is then pressed in contact with a moist image receiving medium which comprises titanium dioxide and is prepared in accordance with the procedure set forth in paragraphs 1 and 2 of Example 1. The media are maintained in contact with each other for about 5 seconds. The media are then stripped apart and the image receiving medium is uniformly exposed for about 2 seconds to the source of Example 1. Thereafter, a high quality positive image pattern is obtained upon immersing the medium in a methanolic developer solution comprising about 2 grams of phenidone and about 2.5 grams of citric acid per 80 milliliters of solution. The developed medium is then fixed by contacting same with a methanolic solution comprising 7 percent by weight of potassium thiocyanate.

It is to be understood that substantially the same results can be obtained in the practice of my invention when other image storage media comprising other photoconductive materials, such as silver halide in combination with other water soluble metal compounds which can be converted to photolytic species thereof, are substituted for the image storage media shown in Examples 1 and 2,

EXAMPLE 3

The image storage medium of Example 1 is immersed in a saturated methanolic solution of silver nitrate and exposed in a Beseler box to ultraviolet light from a 4-watt, black light fluorescent lamp for less than 1 second.

The so exposed medium is then immersed in a developer comprising one gram of phenidone and 8 grams of citric acid per 100 milliliters of methanol.

The medium is then pressed in contact with a moist image receiving medium which comprises $TiO_2$, and which was prepared in accordance with the procedure set forth in paragraphs 1 and 2 of Example 1. However, said image receiving medium was uniformly exposed before being contacted with the image containing medium. The image containing and image receiving media are maintained in contact for about 5 seconds. The media are then stripped apart. A positive image pattern is visible in the image receiving medium after exposure thereof.

EXAMPLE 4

An aqueous solution of silver chloride and polyvinyl alcohol binder of the following composition:

1:2 weight ratio of silver chloride to binder
10% excess chloride ion (compared to silver ion on a molar basis)
4.5% total solids
12.4 grams silver chloride per liter
pH=5.9 to 6.2
Viscosity—6 to 8 cps.

is coated on a radiation transmissive substrate and allowed to dry to form a silver halide emulsion layer having a coat weight of about 0.5 grams per square meter. This coated photosensitive medium is immersed in a saturated solution of silver nitrate and pressed in contact with an image receiving medium comprising a brush-grained anodized aluminum plate as the substrate, and between the photosensitive medium and the receiving medium is placed in a pressure releasable container a viscous reducing agent capable of reducing the silver ion transferred to the receiving medium to free metal. The photosensitive side of the media are exposed and placed under pressure to release the reducing agent from the container. The media are stripped apart about 5 seconds after releasing the reducing agent to disclose a positive image in the receiving sheet. A high quality positive printing image is produced by immersing the imaged receiving medium for about three minutes in a stabilized physical developer of the following composition:

I

| | G. |
|---|---|
| $Fe(NH_4)_2(SO_4)_2 \cdot 6H_2O$ | 78.49 |
| $Fe(NO_3)_3 \cdot 9H_2O$ | 25.2 |
| Tartaric acid | 80 |

$H_2O$ to 1 liter.

II

| | G. |
|---|---|
| Armac 12D (ionic surfactant) | 1.0 |
| Synthropol N (non-ionic surfactant) | 1.0 |

$H_2O$ to 1 liter.

III

| | G. |
|---|---|
| $AgNO_3$ | 51.0 |

$H_2O$ to 100 ml.

Working developer=250 ml. of I +50 ml. of II, +6 ml. of III, to produce a coherent silver image upon the substrate.

The image thus produced is a coherent metallic silver image which is adherently bonded to the aluminum substrate. The metal image is tested by applying pressure sensitive Scotch Brand tape and rapidly removing the Scotch Brand tape from the plate. The image metal is not removed indicating the good adhesion of the silver image to the aluminum substrate. This imaged medium is then lacquered and gummed and put on an offset printing press to produce thousands of prints of the original.

Similar results are obtained when the reducing agent is incorporated in the photosensitive medium instead of the silver nitrate and where the pressure releasable container contains silver nitrate solution instead of reducing agent. In this embodiment the reducing agent is preferably in a layer between the radiation transmissive substrate and the photosensitive layer.

Many modifications of the details of the above examples, offered for the purpose of illustrating my invention, are included within the spirit and scope of the invention defined in the appended claims.

Having described my invention, together with preferred embodiments thereof, as well as manners of practicing same, what I declare as new and desire to secure by U.S. Letters Patents is as follows:

What is claimed is:

1. A process for producing an image comprising the steps of:

(a) exposing an image storage medium comprising a substrate and a radiation sensitive system which comprises a radiation sensitive material selected from the group consisting of silver halide, titanium dioxide, and zinc oxide which upon exposure is capable of producing a physically developable image and water soluble image forming materials comprising a metal compound which is different from said radiation sensitive material, which radiation sensitive system upon exposure undergoes physical development in exposed portions of said system by means of an oxidation-reduction type reaction to form an insoluble image in the exposed portions of the medium; and (b) contacting said image storage medium with an image receiving medium in the presence of a solvent for said image forming materials and a photographic reducing agent for the metal ion of the metal compound, whereby said image forming materials in the unexposed portion of said image storage medium are transferred to said image receiving medium, and said transferred image forming materials establish a positive image pattern in said image receiving medium.

2. The process of claim 1 wherein said image receiving medium comprises a radiation sensitive photoconductive material.

3. The process of claim 1 wherein said image receiving medium comprises a radiation sensitive photoconductive material and is uniformly exposed to activating radiation before said positive image pattern is established therein.

4. The process of claim 1 wherein said image storage medium comprises a radiation sensitive titanium dioxide.

5. The process of claim 1 wherein said image storage medium comprises a radiation sensitive zinc oxide.

6. The process of claim 1 wherein said image forming materials comprise a solution of silver ions.

7. The process of claim 1 wherein said image forming materials comprise a solution of at least one member of the group consisting of a solution of silver ions, mercury ions, copper ions, nickel ions, tin ions and gold ions.

8. The process of claim 1 wherein said image storage medium is contacted with a solution of a reducing agent prior to step b.

9. A process as in claim 1 wherein the image forming materials comprise a water soluble metal compound which upon exposure is converted to a water insoluble material.

10. A process for producing an image comprising the steps of:

(a) exposing to a source of activating radiation an image storage medium comprising a substrate and a radiation sensitive system which comprises a photosensitive material selected from the group consisting of silver halide, titanium dioxide, and zinc oxide which upon exposure is capable of producing a physically developable image and a water soluble metal compound which is different from said radiation sensitive material which upon contact with the exposed photosensitive material physically develops these exposed areas by an oxidation-reduction type reaction to form a water-insoluble photolytic species of said metal compound;

(b) applying to said medium, a developer solution comprising a photographic reducing agent and a solvent for said metal compounds; and (c) contacting said image storage medium with an image receiving medium whereby said soluble metal compound in the unexposed portion of said image storage medium is transferred to said image receiving medium and said transferred compound establishes a positive image pattern in said medium.

11. The process of claim 10 wherein said image storage medium comprises a metal oxide or silver halide.

12. The process of claim 10 wherein said image storage medium comprises titanium dioxide or zinc oxide.

13. The process of claim 10 wherein said image receiving medium comprises a photoconductor.

14. The process of claim 10 wherein said water soluble metal compound comprises silver, gold, mercury, copper, nickel or tin compound.

15. A photographic product comprising a photosensitive layer comprising a photosensitive material selected from the group consisting of silver halide, titanium dioxide, and zinc oxide which upon exposure is capable of producing a physically developable image and an image receiving layer for receiving by transfer a positive print and a substantially non-photosensitive image forming material comprising a water soluble metal compound which is different from said radiation sensitive material and a reducing agent therefor and which image forming materials upon contact with exposed portions of the photosensitive layer will cause formation of a metal image in these areas by means of physical development.

16. A photographic product as in claim 15 wherein at least a portion of the image forming materials are present in a pressure releasable container between the photosensitive layer and the image receiving layer.

17. A photographic product as in claim 15 wherein the reducing agent of the image forming material is present in the photosensitive layer and wherein the oxidizing agent of the image forming material is present in the image receiving layer, and wherein the oxidizing agent and reducing agent are so separated that they will not react under ordinary ambient conditions.

18. The photographic product of claim 15 wherein the reducing agent of the image forming material is present in the photosensitive layer and wherein the oxidizing agent is present in the image receiving layer and wherein the oxidizing agent and reducing agent are separated from reacting with one another by a temporary barrier means.

19. A photographic product as in claim 15 wherein the photosensitive material comprises a photoconductor.

20. A photographic product as in claim 15 wherein the photosensitive material comprises silver halide and wherein the image forming materials comprise a substantially non-radiation sensitive metal compound and a reducing agent therefor.

21. A photographic product as in claim 15 wherein the image forming materials comprise a substantially non-radiation sensitive metal compound and a reducing agent therefor.

22. A photographic product as in claim 16 wherein the pressure releasable container contains the image forming materials in the form of a viscous solution of metal ions and a viscous solution of a reducing agent therefor.

23. A photographic product as in claim 16 wherein the photosensitive material is at least one member selected from the group consisting of silver halide or a metal oxide.

24. A photographic product as in claim 23 wherein the metal oxide is a fine particle size titanium dioxide, and wherein the image forming material comprises at least one member selected from the group consisting of silver ions, copper ions, nickel ions and tin ions.

25. A photographic product as in claim 15 wherein the image receiving layer comprises a radiation sensitive photoconductive material.

26. A photographic product as in claim 24 wherein the radiation sensitive photoconductive material is titanium dioxide.

References Cited

UNITED STATES PATENTS

| | | | |
|---|---|---|---|
| 2,607,685 | 8/1952 | Land | 96—76 X |
| 2,543,181 | 2/1951 | Land | 96—29 |
| 3,052,541 | 9/1962 | Levinos | 96—27 |
| 3,380,823 | 4/1968 | Gold | 96—27 |
| 3,335,055 | 8/1967 | De Haes | 96—29 |
| 3,042,514 | 7/1962 | Roth | 96—29 |
| 2,757,069 | 7/1956 | Patterson | 96—114.6 |
| 3,326,712 | 6/1967 | Sanders | 117—76 |

OTHER REFERENCES

Mees: The Theory of Photographic Process, 131–134.

NORMAN G. TORCHIN, Primary Examiner

U.S. Cl. X.R.

96—76, 48